June 29, 1926.

L. R. CULVER

SEMITRAILER

Filed April 17, 1924

Inventor
L. R. Culver
by Hazard and Miller
Att'ys

June 29, 1926.

L. R. CULVER 1,590,615

SEMITRAILER

Filed April 17, 1924      9 Sheets-Sheet 5

Inventor
L. R. Culver
by Hazard and Miller
Att'ys

June 29, 1926.
L. R. CULVER
SEMITRAILER
Filed April 17, 1924 9 Sheets-Sheet 6
1,590,615
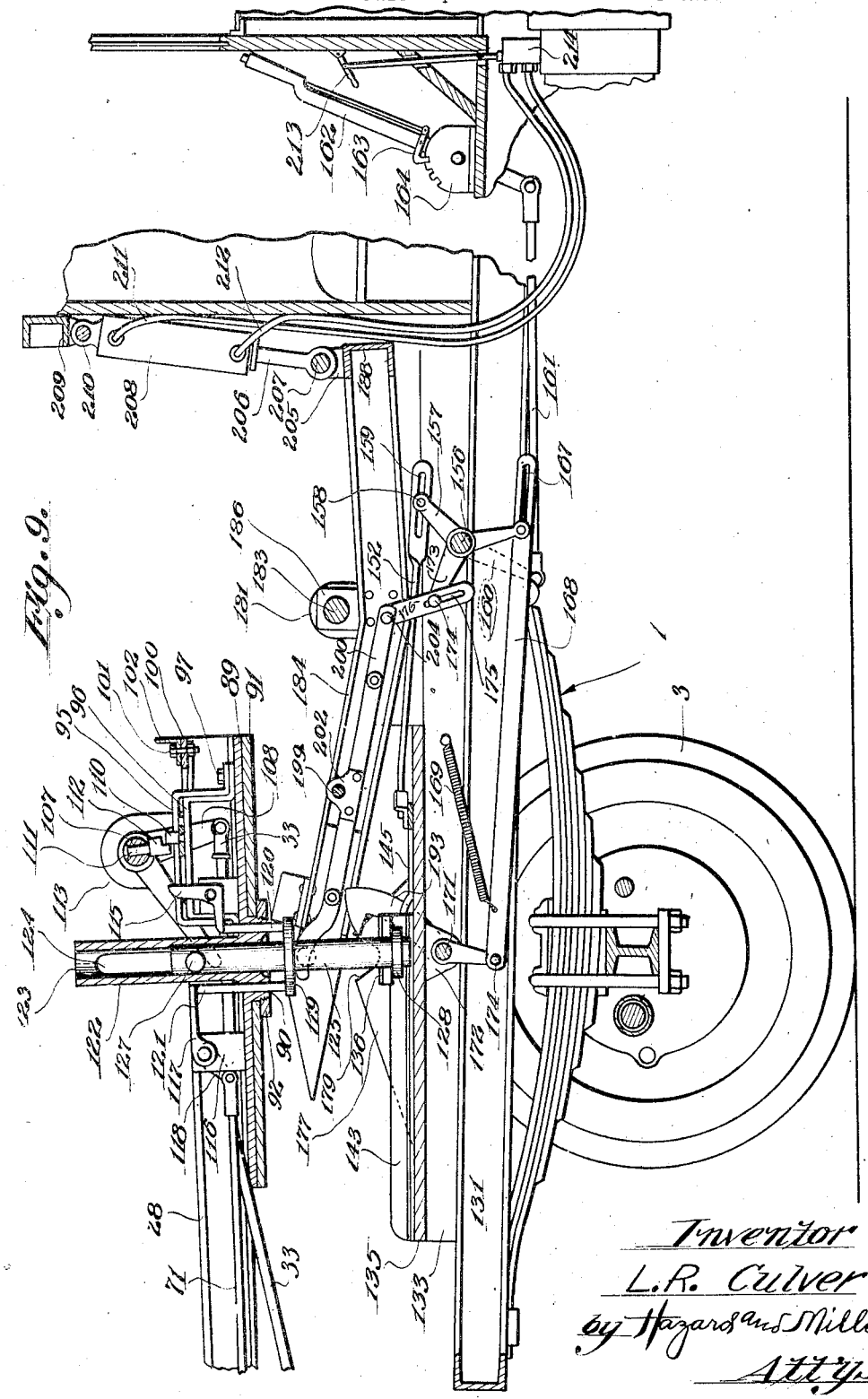

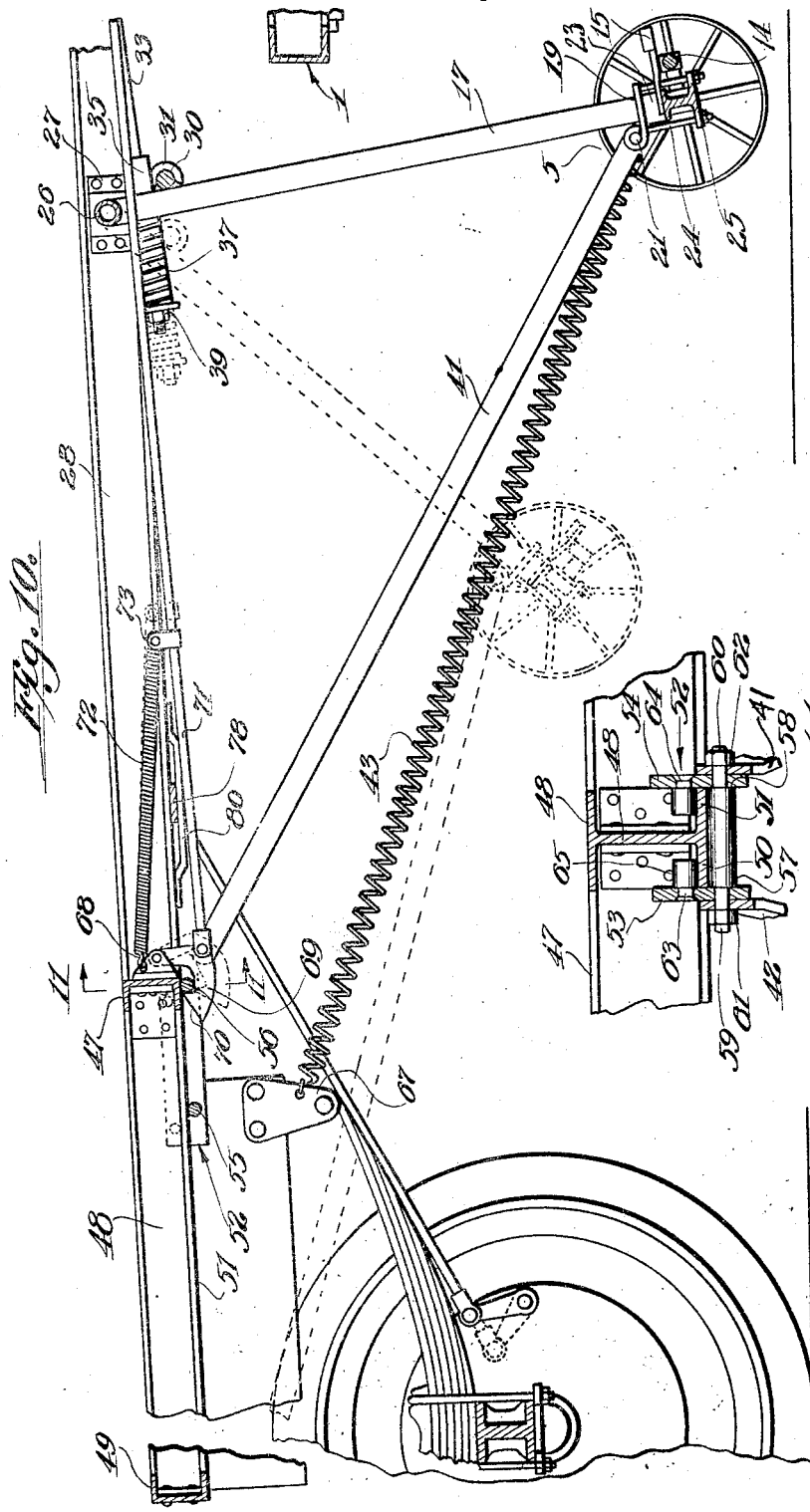

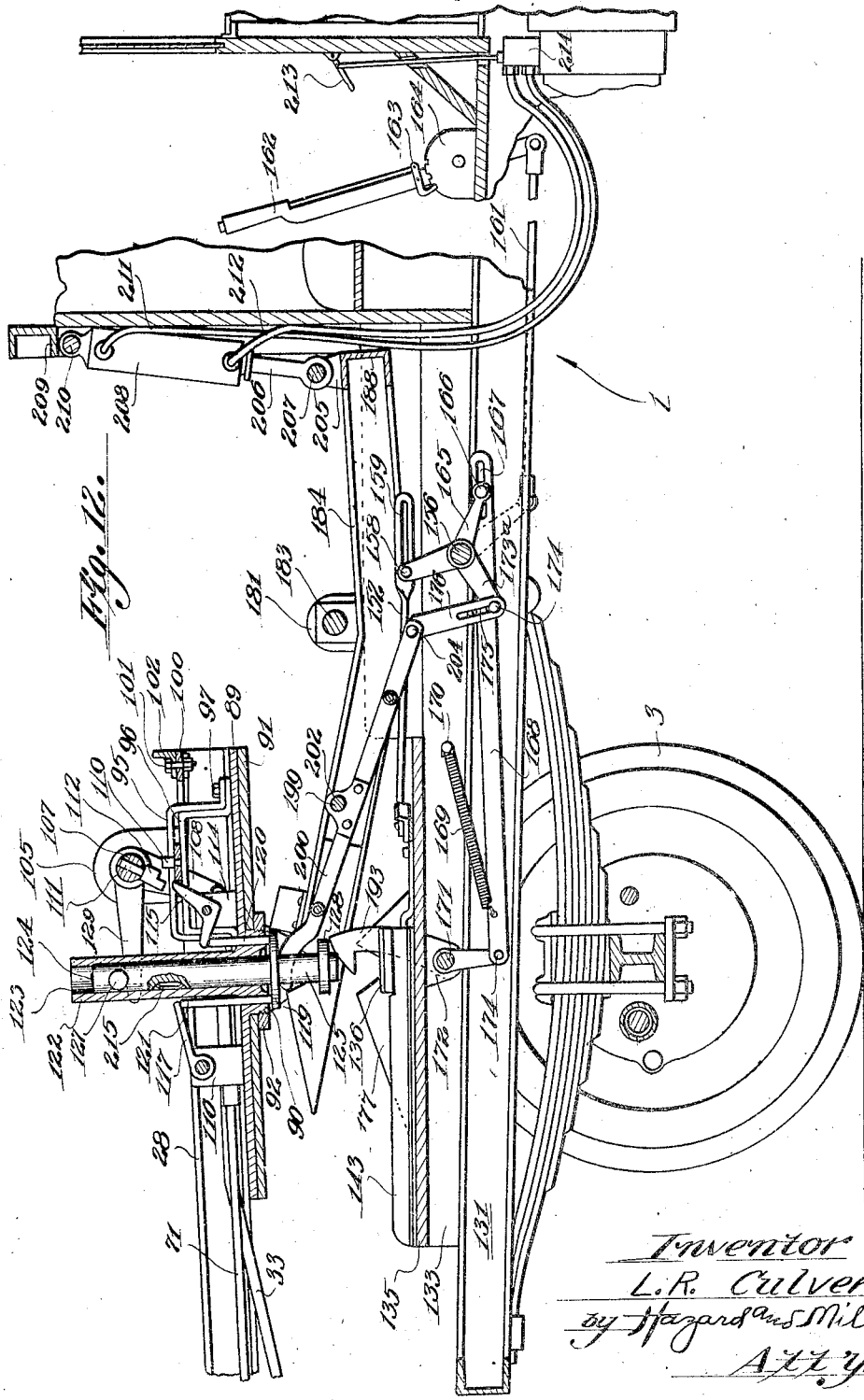

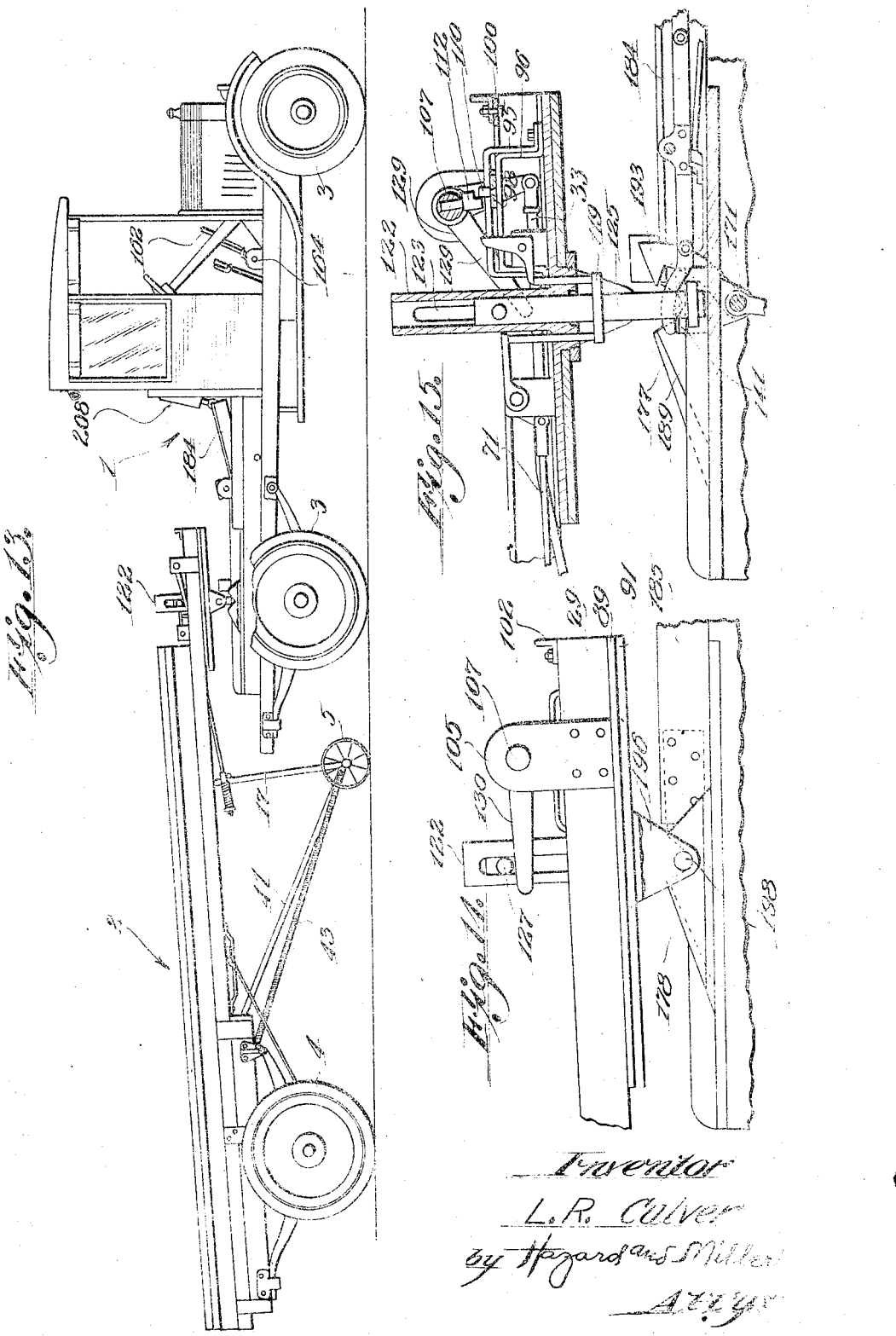

Patented June 29, 1926.

1,590,615

UNITED STATES PATENT OFFICE.

LAGAR RUAL CULVER, OF LOS ANGELES, CALIFORNIA, ASSIGNOR TO NEW-COMER TRAILER MFG. CO., OF LOS ANGELES, CALIFORNIA.

SEMITRAILER.

Application filed April 17, 1924. Serial No. 707,131.

My invention relates to semitrailers and consists of the novel features herein shown, described and claimed.

More specifically, my invention relates to tractors and semitrailers adapted to be attached together and detached, and with special reference to the mechanism for connecting the semitrailers to the tractors and for supporting the semitrailers when disconnected from the tractors.

A leading object of my invention is to make a mechanism for connecting semitrailers to tractors and having a jack for raising the forward end of a trailer and secondary wheels for supporting the trailer in its resting position so that the tractor may be readily driven away from the trailer and so that the tractor may be returned to the trailer and the jack operated to lower the trailer onto the tractor to make the coupling.

Another object is to raise the front end of the semitrailer high enough so that when the springs of the tractor expand by being relieved of the load of the trailer still the tractor will pass freely under the raised end of the trailer.

Another object is to make connecter elements on a tractor and connecter elements on a trailer to engage and disengage the elements on the tractor by vertical movement.

Another object is to make connecter elements on a tractor and connecter elements on a turntable on a trailer to engage the elements on the tractor by moving the turntable into registration and lowering the trailer.

Another object of my invention is to make a mechanism for connecting a semitrailer to a tractor and having a brake mechanism to hold the trailer while the trailer is standing alone disconnected from the tractor, said brake mechanism being set by the disconnecting operation.

Another object is to make improved means for supporting a semitrailer when disconnected from a tractor, said means including secondary wheels to be raised or lowered and to be controlled from the tractor but operated from the trailer.

Another object is to make a hydraulic jack mounted upon and operated by a tractor for raising and lowering the forward end of a semitrailer in connecting or disconnecting the trailer to the tractor.

Another object is to make coupling members to be carried by a tractor and a semitrailer and which may be connected or disconnected by raising or lowering the forward end of the semitrailer.

Another leading object of my invention is to make a mechanism for connecting semitrailers to tractors so that when the forward ends of the semitrailers are raised and disconnected from the tractors the trailers are held while the tractors are driven away and the tractors may return to be connected to the trailers at any angle at which the tractor will clear the means for supporting the front end of the trailer.

Other objects and advantages will appear from the drawings and specification.

The drawings illustrate the invention.

Fig. 5 is a fragmentary vertical cross section on the lines 5—5 of Figs. 3 and 4 and looking forwardly as indicated by the arrows.

Fig. 6 is a fragmentary horizontal sectional detail on the lines 6—6 of Figs. 4 and 5.

Fig. 7 is an enlarged fragmentary vertical longitudinal sectional detail on a plane parallel with Figs. 1 and 4 and on the line 7—7 of Fig. 5.

Fig. 8 is an enlarged fragmentary vertical cross section on the line 8—8 of Fig. 6.

Fig. 9 is a view analogous to Fig. 4 and showing the jack operated to raise the forward end of the trailer as in making a disconnection or uncoupling the trailer from the tractor, the parts being in the same relative positions when starting to lower the trailer to couple the trailer to the tractor.

Fig. 10 is a continuation of Fig. 9 and showing the operation of the secondary wheels for supporting the forward end of the semitrailer while the tractor drives away.

Fig. 11 is a fragmentary cross sectional detail of the slide which controls the secondary wheels and taken on a line 11—11 of Fig. 10.

Fig. 12 is a view analogous to Fig. 9 and showing the operating lever pulled backwardly and showing the result of this operation, the principal result being shown in dotted lines in Fig. 10.

Fig. 13 is a side elevation analogous to Fig. 1 and showing the trailer having its forward end elevated and resting upon the secondary wheels so that the tractor may be driven away.

Figure 1:
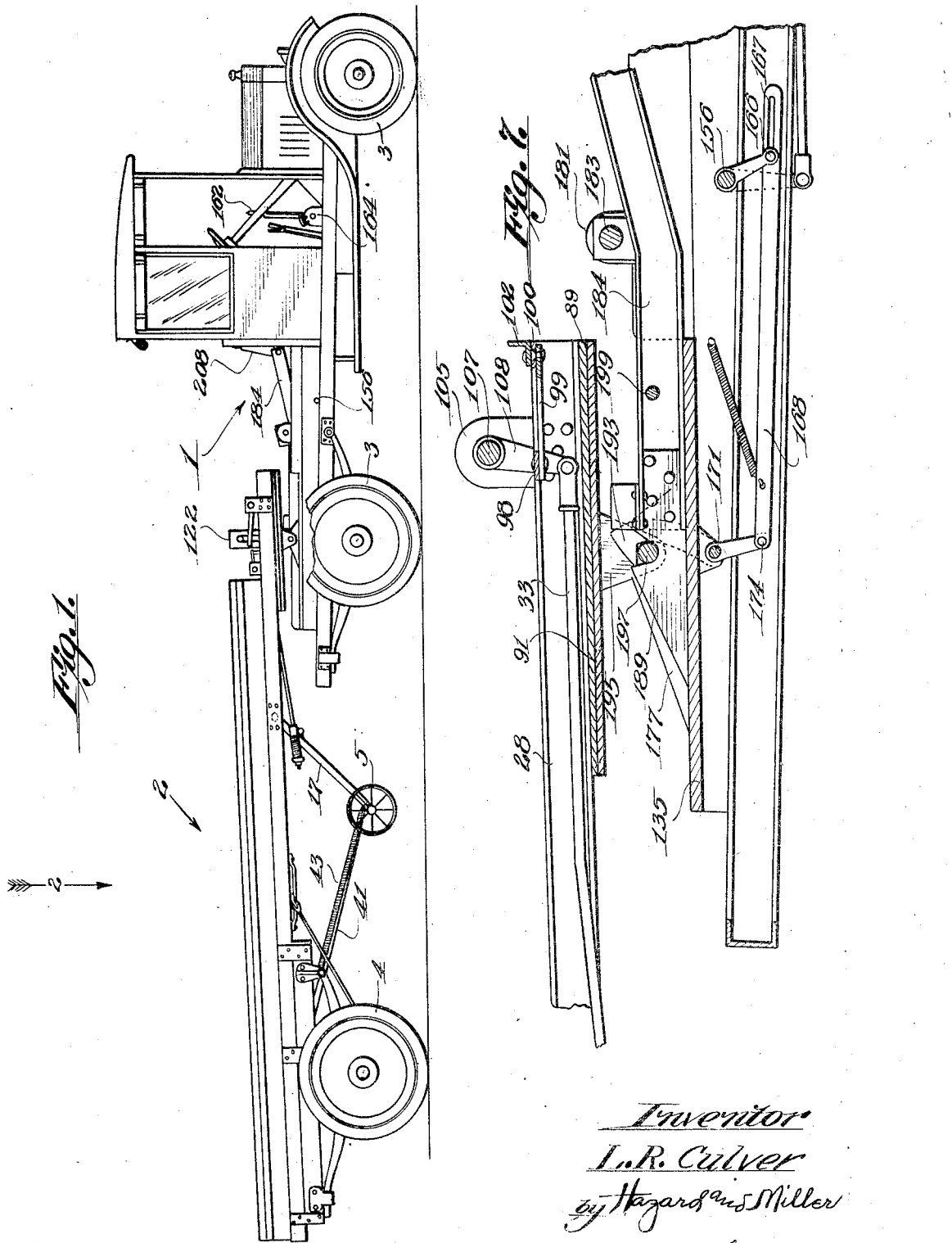
Figure 1 is a side elevation of a semitrailer embodying the principles of my invention and showing the train comprising a tractor and a semitrailer coupled together and ready for movement.
Figure 2:
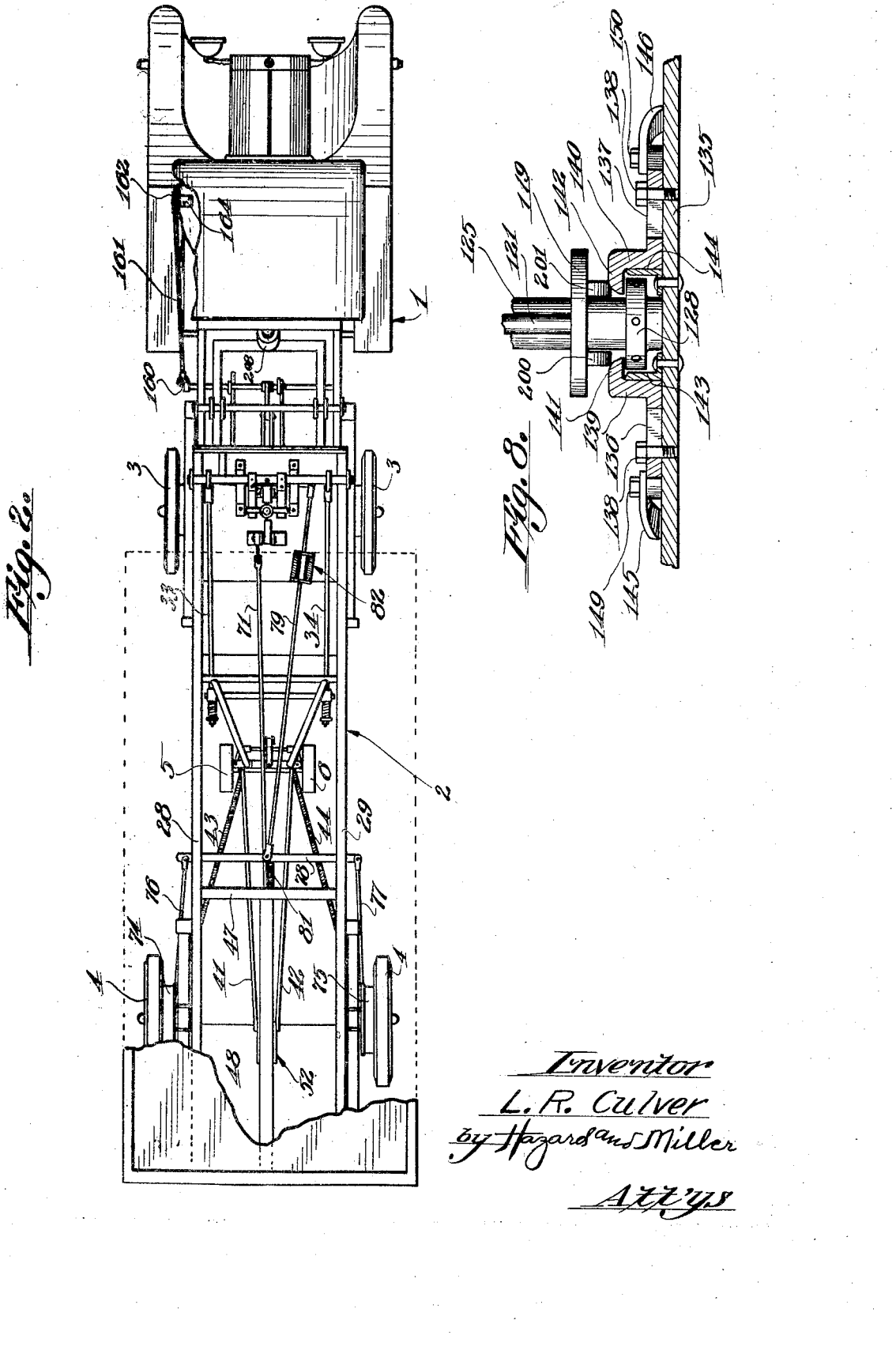
Fig. 2 is a top plan view looking in the direction indicated by the arrow 2 in Fig. 1, the bed of the trailer being broken away to show the mechanism.
Figure 4:
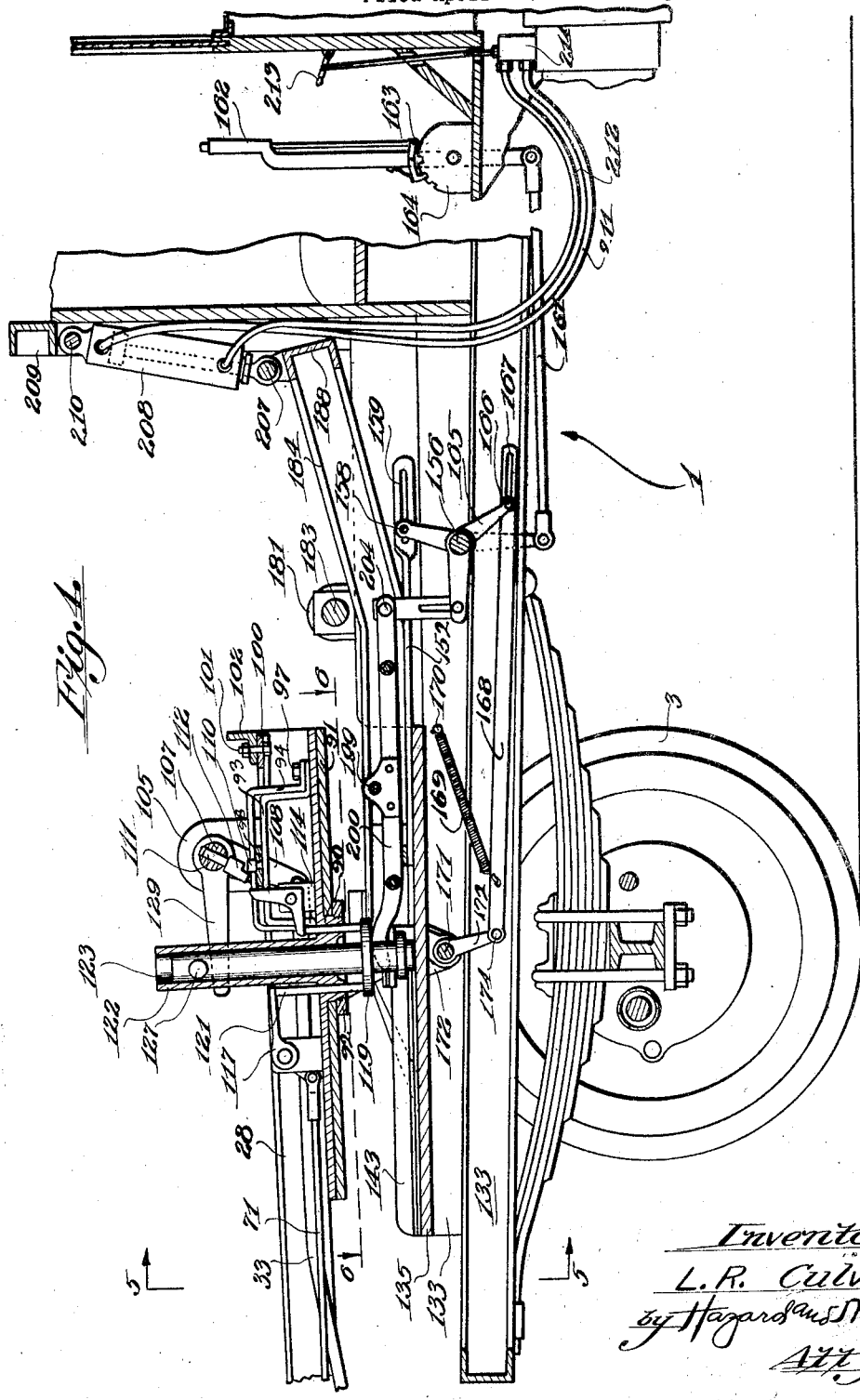
Fig. 4 is an enlarged fragmentary vertical longitudinal sectional detail on the line 4—4 of Fig. 3 and looking in the direction indicated by the arrows.

Fig. 14 is an enlarged fragmentary side elevation of the connecting mechanism and adjacent parts on the same plane as Figs. 1 and 13 and on a plane parallel with Figs. 4, 9 and 12, and is seen looking in the direction indicated by the arrow 14 in Fig. 5.

Fig. 15 is a fragmentary sectional elevation on a plane parallel with Fig. 14 and showing the connector parts in the same positions as in Fig. 13 and showing the operation following the operation in Fig. 9; that is, with the jack reversed ready for the tractor to be driven away.

The details of the semi-trailer are as follows:

The automobile train consists of a tractor 1 and a semitrailer 2. The tractor 1 carries all of the power mechanism and is mounted on four wheels 3 and is not adapted to carry any other load than the forward end of the trailer 2. The trailer 2 is mounted on two traction wheels 4 and has two secondary wheels 5 and 6.

The axle 7 has a solid central portion with forks 8 and 9 at its ends and the wheels 5 and 6 are mounted upon stub axles 10 and 11 extending between forks 8 and 9 and secured by vertical pivots 12 and 13, so that the wheels 5 and 6 are steerable. Arms extend forwardly from the stub axles 10 and 11 and are connected by a link 14. A steering lever 15 is pivotally connected to the link 14 and to the axle 7 and a handle 16 forms an extension on the lever 15 to be manually operated when it is desired to move the trailer without connection to the tractor.

The struts 17 and 18 are welded to plates 19 and 20 having hinged members 21 and 22. Blocks 23 are placed upon the axle 7 and the plates 19 and 20 fit upon the blocks and clamping bolts 24 are inserted downwardly through the plates 19 and 20 past the axle 7 and through the flanges or ears 25 extending from the axle, so as to rigidly clamp the lower ends of the struts 17 and 18 to the axle.

In making an adjustment to fit trailers of different heights the blocks 23 and the bolts 24 may be increased or diminished. The upper ends of the struts 17 and 18 are welded to a pipe 26 and the ends of the pipe extend through bearing plates 27 secured to the side bars 28 and 29 of the trailer. A brace rod 30 is welded to the struts 17 and 18 near their upper ends parallel with the pipe 26 and extends beyond the struts to form pintles upon which the bearings 31 and 32 are mounted. Operating bars 33 and 34 are slidingly mounted through bearings 35 and 36 formed integral with and at right angles to the bearings 31 and 32. Springs 37 and 38 are mounted upon the rods 33 and 34 against the bearings and 36 and spring seats and nuts 39 and 40 are screwed upon the rods 33 and 34 against the springs 37 and 38. Braces 41 and 42 are pivotally connected to the hinge members 21 and 22 and extend backwardly and upwardly. Retractile coil springs 43 and 44 are connected to the hinge pins 45 and 46 which connect the braces 41 and 42 to the hinge members 21 and 22.

A cross bar 47 is inserted between the side bars 28 and 29 some distance in front of the rear axle of the trailer and an intermediate bar 48 extends from the cross bar 47 to the end bar 49. This intermediate bar 48 is an I-beam as shown in Fig. 11 and has lower flanges 50 and 51 and a slide 52 is mounted upon these flanges and consists of side plates 53 and 54. Round bars 55 and 56 are turned down at their ends to form shoulders 57 and 58 and the pintles 59 and 60 are inserted through the plates 53 and 54 until the plates engage the shoulders 57 and 58 and the plates are properly spaced apart by these shoulders to fit slidably against the edges of the flanges 50 and 51. The upper ends of the braces 41 and 42 fit upon the pintles 59 and 60 against the plates 53 and 54 and nuts 61 and 62 are screwed upon the pintles against the braces so as to pivotally connect the braces to the slide. Pintles 63 and 64 are fixed through the plates 53 and 54 and project inwardly and have rollers 65 and 66 running upon the flanges 50 and 51, so as to securely support the slide 52 and allow it to travel upon the intermediate bar 48 from the cross bar 47 backwardly. The springs 43 and 44 are connected to brackets 67 forming a rigid part of the trailer frame, the tension of the springs being exerted to pull the secondary wheels 5 and 6 backwardly and upwardly as shown in Fig. 1, so that the forward end of the trailer will rest upon the truck and in this operation the braces 41 and 42 move the slide 52 backwardly. A bearing bracket 68 is secured to the front face of the cross bar 47 and a hook 69 is pivotally connected to the bracket 68 so that when the slide 52 moves forwardly the hook 69 will engage under the forward one of the bars 56 and securely hold the slide 52 from moving backwardly and thereby holding the struts 17 and 18 upright, so that the trailer may rest upon the secondary wheels 5 and 6. The hook 69 has an inclined face 70 leading to the hook slot. A rod 71 is connected to the hook 69 and extends forwardly and a spring 72 is connected to a clip 73 mounted upon the rod 71 and to the bearing bracket 68. the tension of the spring being exerted to throw the hook 69 backwardly into operative position and the rod 71 being operated to pull the hook forwardly and allow the slide 52 to operate.

Brake constructions 74 and 75 controlling the trailer wheels 4 have rods 76 and 77 connected to a lever 78 and a rod 79 is connected to the center of the lever 78 and extends forwardly.

Figure 3:
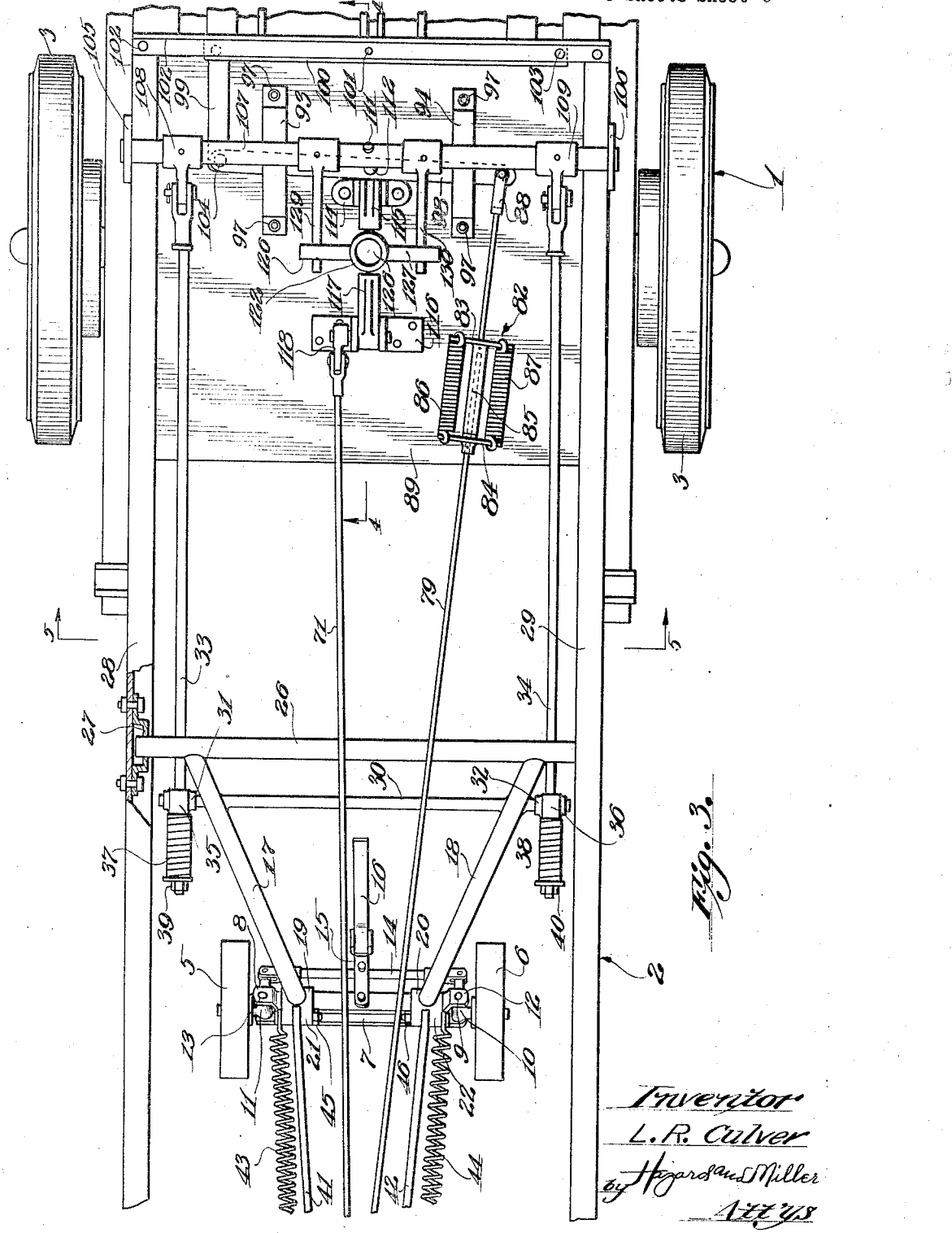
Fig. 3 is an enlarged fragmentary plan view of the forward end of the semitrailer and the rear end of the tractor.

The cross bar 78 is mounted in slideways 80 formed at the lower faces of the side bars 28 and 29 and a retractile coil spring 81 connects the central portion of the cross bar 78 to the cross bar 47. An elastic member 82 is incorporated into the rod 79 and the details of this member are best shown in Fig. 3. The rod 79 is cut in two and cross head 83 is rigidly secured to one of the meeting ends of the rod and a similar cross head 84 is secured to the other one of the meeting ends some distance from the end. A tubular guide 85 is rigid with the cross head 83 and the rod extends through the cross head 84 into the guide 85. Retractile coil springs 86 and 87 connect the ends of the cross heads 83 and 84, so that when extra strain is placed upon the rod 79 the springs 86 and 87 will yield. The final end of the rod 79 is attached to a fork 88. A heavy platform 89 is secured against the lower face of the side bars 28 and 29 and extends from the extreme forward end backwardly a considerable distance. A hub 90 extends downwardly from the center of the platform 89 and a turntable 91 is mounted upon the hub against the lower face of the platform and held in place by a nut 92 screwed upon the lower end of the hub 90. Guideways 93 and 94 (See Fig. 4) each consists of an inner bar 95 and an outer bar 96 bent U-shaped and having out-turned ends secured to the platform by bolts 97 and a lever 98 is mounted in the guideways 93 and 94. The fork 88 is connected to one end of the lever 98. A link 99 is connected to the other end of the lever 98 and to a lever 100 (See Fig. 3). A pivot 101 connects the lever 100 to an angle iron 102 secured at its ends to the tops of the side bars 28 and 29. A loose pin 103 is inserted downwardly through the angle iron 102 and through the opposite end of the lever 100 from the link 99, so that when the pin 103 is in place a pivot 104 connecting the lever 98 to the link 99 is practically rigidly mounted and becomes the fulcrum for the lever 98, and so that when the pin 103 is removed the lever 98 has no fixed fulcrum as the link 99 may freely move with the lever 100 turning on the pivot 101.

Bearing posts 105 and 106 are rigidly secured against the outer faces of the side bars 28 and 29 and extend upwardly and a shaft 107 is rotatably mounted in the upper ends of these posts. Crank arms 108 and 109 are fixed upon the shaft 107 and extend downwardly. The rods 33 and 34 are connected to the ends of the crank arms 108 and 109. A stop pin 110 is fixed in the lever 98 near its center and a cam pin 111 is fixed in the shaft 107 and has a cam head 112 to engage the pin 110, so that as the shaft 107 is rotated in the direction of the arrow 113 the cam head 112 will engage the pin 110 and move the lever 98 to pull on the rod 79 to operate the brakes 74 and 75 upon the trailer.

A bearing block 114 is bolted to the platform 89 and a bell crank lever 115 is pivotally mounted in the bearing block 114, one arm of the lever being vertical and adapted to engage the lever 98 and the other arm of the lever being horizontal. A bearing block 116 is bolted to the platform 89 and carries a bell crank lever comprising an arm 117 extending horizontally and forwardly and an arm 118 extending backwardly and downwardly. The rod 71 is connected to the arm 118. A ring 119 is connected to sliding pins 120 and 121, said pins extending upwardly through the hub 90, the pin 120 engaging the horizontal arm of the bell crank lever 115 and the pin 121 engaging the horizontal arm 117 to operate the rod 71. A tube 122 extends upwardly from the platform 89, and a central opening 123 extends through the tube and platform and hub, there being diametrically opposed slots 124 extending from near the upper end of the tube to near the platform. A king bolt 125 is slidingly mounted in the opening 123 and has arms 126 and 127 extending through the slots 124 and has a flange or head 128 upon its lower end. Arms 129 and 130 are fixed upon the shaft 107 and extend under the arms 126 and 127, so that when the king bolt 125 moves downwardly as in Fig. 9 it will rotate the shaft 107 and cause the cam head 112 to engage the pin 110 to operate the lever 98 to operate the rod 79 to operate the brakes upon the trailer and if the pin 103 is removed the brakes may be released manually as hereafter explained.

The side bars 131 and 132 of the tractor are channel bars. Blocks 133 and 134 are mounted upon the side bars and a strong platform 135 is mounted upon the blocks, said platform extending from near the rear end of the tractor to a considerable distance forwardly. Attaching plates 136 and 137 are mounted upon the platform 135 and have parallel slots through which bolts extend, said bolts being tapped into the platform or inserted through the platform with nuts upon the lower end, so that the plates 136 and 137 may slide to and from each other. The inner ends of the plates have portions 139 and 140 extending upwardly at right angles and jaws 141 and 142 extending inwardly. The king bolt 125 goes down and rests upon the platform 135 when the jaws 141 and 142 are open and when the jaws are closed they engage above the flange 128, so that when the forward end of the trailer is elevated the king bolt 125 is held down as in Fig. 9. Angle irons are secured to the platform 135 to form guides 143 and 144, said guides being V-shaped in plan and extending into the space between the vertical portions 139 and 140 of the jaws as shown in Fig. 8 and said guides being wide apart at the extreme rear end of the platform 135, so as to guide the king bolt into position to be engaged by the jaws when connecting the tractor to a trailer. Bell crank levers 145 and 146 are pivoted to the platform 135 by bolts 147 and 148 and corresponding ends of the levers are offset upwardly and connected to the clutches by bolts 149 and 150. The opposite ends of the levers overlap and are connected by pin 151, there being sufficient looseness or lost motion to allow the levers to swing to the desired extent. A rod 152 is connected to one end of one of the levers 145 and 146 by pivot 153 and a retractile coil spring 154 connects the lever to a pin 155 fixed in the platform 135, the tension of the spring being exerted to hold the clutches closed and the operation of the rod 152 in the direction indicated by the arrow serving to open the clutches and release the king bolt.

A rock shaft 156 is mounted crosswise of the tractor upon the bars 131 and 132. A crank arm 157 extends upwardly from the shaft 156 and a bolt 158 extends through the crank arm and through a slot 159 in the rod 152. An arm 160 extends downwardly upon the shaft 156 and a link 161 connects the arm 160 to the lower end of the operating lever 162, said operating lever having a pawl 163 engaging a quadrant 164. An arm 165 extends from the shaft 156 and has a pin 166 operating in a slot 167 in a rod 168. A retractile coil spring 169 connects the rod 168 to a pin 170 fixed upon the tractor frame, the tension of the spring being exerted to pull the rod forwardly. A rock shaft 171 is mounted in brackets 172 and 173 extending downwardly from the platform 135 and an arm 172 extends downwardly from the shaft 171 and is connected to the rear end of the rod 168. An arm 173ᵃ extends from the shaft 156 and has a pin 174 operating in a slot 175 in a link 176.

Angle irons 177 and 178 are secured to the platform 135 and have notches 179 and 180 in their upstanding flanges, said notches being in transverse alignment. Bearing blocks 181 and 182 are secured to the outer faces of the side bars 131 and 132 and extend upwardly and a shaft 183 is mounted in the upper ends of these bearing blocks. Jack levers 184 and 185 have hanging bearings 186 and 187 mounted upon the shaft 183. The jack levers 184 and 185 are bent upwardly both ways from the bearings 186 and 187 as shown in Fig. 12. The forward ends of the levers 184 and 185 are rigidly connected by a channel bar 188. Plates 189 and 190 form extensions backwardly from the jack levers 184 and 185 and have notches 191 and 192 in their upper edges in transverse alignment with the notches 179 and 180. Hooks 193 and 194 are fixed upon the ends of the rock shaft 171 and extend upwardly through the platform 135 substantially in line with the notches 179 and 180. Pairs of hangers 195 and 196 extend downwardly from the turntable 91 and carry cross bars 197 and 198, so that when the parts are in proper positions the cross bars 197 and 198 will fit in the notches 179 and 180 and will be held in place by the hooks 193 and 194 and will fit in the notches 191 and 192 of the jack levers, so that when the hooks 193 and 194 are unhooked and the jack is operated the jack extensions 189 and 190 will engage the bars 197 and 198 and lift the forward end of the trailer as shown in Fig. 5.

A shaft 199 is mounted in the jack levers 184 and 185 substantially half way between the shaft 183 and the notches 191 and 192. Mating levers 200 and 201 are connected to the shaft 199 by bearings 202 and are rigidly secured together and spaced apart by a spacing sleeve and rivet 203 and the rear ends of the bars are curved outwardly to receive the king bolt 125 and engage the ring 119. A pin 204 connects the forward ends of the levers 200 and 201 to the link 176.

A bearing block 205 is attached to the channel bar 188. A piston rod 206 is connected to the bearing block 205 by a pin 207. A piston cylinder 208 is connected to an overhead bar 209 by a pivot 210. A hose 211 is connected to the upper end of the piston cylinder 208 and a similar hose 212 is connected to the lower end. The piston upon the piston rod 206 operates in the cylinder 208 and the direction of movement depends upon which hose 211 or 212 is carrying the hydraulic pressure. When the pressure is flowing through the hose 211 the piston will go down and rock the jack levers 184 and 185 to raise the forward end of the semitrailer and disconnect the trailer from the tractor and when the pressure is going through the hose 212 and exhausting through the hose 211 the jack will be rocked the other way to lower the trailer and make the connection. The hydraulic pressure through the hose 211 and the hose 212 may come from any suitable well known apparatus as is usually used on a dump truck.

Thus I have produced means for connecting tractors to semitrailers and accessories and serving mechanisms which are connected, operated and disconnected by the operation of connecting a trailer to a tractor.

A platform 135 upon the tractor, the angle irons 177 and 178 having notches 179 and 180 and the hooks 193 and 194 upon the shaft 171 and cooperating parts serve as tractor connecter assemblies and the hangers 195 and 196 carrying the bars 197 and 198 to engage the tractor connecter assemblies and carried by the turntable 91 or the semitrailer connecter elements, said elements being adapted to go together and apart by vertical movement of the front end of the trailer.

The king bolt 125 and the guideway formed by the bars 143 and 144 and the clutches 141 and 142 serve as assemblies for guiding and centering the connecter elements.

The king bolt 125, the clutches 141 and 142 serve as means for operating and connecting and disconnecting the serving elements partly mounted on the tractor and partly mounted on the trailer to be controlled by the operator on the tractor.

The mechanism carrying the plates 189 and 190 forms a jack upon the tractor operated by the power mechanism of the tractor for raising and lowering the forward end of the trailer to connect or disconnect the tractor and trailer and the serving elements.

In Fig. 1 I have shown the semitrailer 2 connected to the tractor 1 in accordance with the principles of my invention. The secondary wheels 5 and 6 are withdrawn and the train is ready to be operated. One of the principal uses that I have in view for this semitrailer is to have a plurality of semitrailers for a single tractor, go to a loading station with a tractor and trailer, load the trailer, haul the trailer to the unloading station, uncouple the tractor and leave the trailer to be unloaded, take an empty trailer back to the loading station, have the second trailer loaded, haul it to the unloading station, uncouple the tractor from the second trailer and leave it to be unloaded, and couple the tractor to the first trailer, so that the operator of the tractor may be kept reasonably busy and not have to wait for the loading and unloading operations.

When the train shown in Fig. 1 reaches the loading station and the trailer has been properly loaded the operator of the tractor will push the lever 162 forwardly as shown in Fig. 9 thereby rocking the shaft 156 and moving the rod 168 backwardly to operate the hooks 193 and 194 to release the bars 197 and 198 so that the connecter elements may be separated. Then the operator will manipulate the lever 213 to control the pump 214 and pump the liquid through the hose 211 to the top of the piston in the cylinder 208 thereby pushing downwardly upon the piston and rocking the jack to raise the forward end of the trailer as shown in Figs. 9 and 12 thereby disengaging the trailer connecter elements from the tractor connecter elements and holding the king bolt 125 down to operate the arms 129 and 130 thereby moving the lever 98 and pulling on the rod 79 to set the brakes 74 and 75 upon the trailer. This operation of the shaft 107 also operates the arms 108 and 109 to pull the rods 33 and 34 to move the secondary wheels 5 and 6 downwardly and forwardly as shown in Fig. 10. This operation swings the struts 17 and 18 forwardly to a point beyond the vertical plane of their pivots and pulls the slide 52 forwardly until the bar 56 passes the hook 69 thereby locking the braces 41 and 42 to hold the secondary wheels rigidly in position to support the forward end of the trailer. Then the operator will manipulate the hand lever 213 to reverse the jack thereby lowering the secondary wheels 5 and 6 to the ground and the trailer is set with the brakes tight and the forward end of the trailer resting upon the secondary wheels 5 and 6.

Continued operation of the hydraulic system will still further reverse the jack until the jack returns to its normal position and the tractor may be driven away.

At this time the trailer stands in the position shown in Fig. 13 with the secondary wheels upon the ground and supporting the trailer and the king bolt 125 is held down by the jaws 141 and 142 and when the tractor drives away the king bolt will pass backwardly from between the jaws 141 and 142 and remain in this depressed position thereby holding the brakes set upon the trailer. While the trailer is standing alone if it is desired to move the trailer the brakes may be unset by removing the pin 103 and the trailer may be guided by manually manipulating the arm 16.

When the tractor returns and is to be connected to the trailer the turntable 91 is manually rotated to bring the connecter elements including the bars 197 and 198 into an angle corresponding to the angle at which the tractor will back under the trailer and then the tractor is manipulated so that the king bolt 125 will pass between the guide bars 143 and 144 to its position between and under the clutches 141 and 142.

When the parts are all in proper vertical planes the jack is operated by manipulating the handle 213 to move upwardly and raise the forward end of the trailer until the secondary wheels 5 and 6 are clear of the ground, then the hand lever 162 is pulled backwardly thus raising the ring 119 and causing the bell crank lever 115 to be operated by the pin 120 to engage the lever 98 and hold the brakes set upon the trailer and at the same time the pin 121 will engage the bell crank arm 117 and pull the rods 71 to pull the hook 69 out of engagement with the bar 56 and allow the springs 43 and 44 to pull the secondary wheels 5 and 6 backwardly to clear the ground as shown in dotted lines in Fig. 10. Pulling the lever 162 backwardly operates the rod 152 to open the clutches 141 and 142 and release the king bolt 125 and the tensions of the springs 43 and 44 transmitted through the struts 17 and 18 and the rods 33 and 34 rotates the shaft 107 to move the arms 129 and 130 upwardly against the arms 126 and 127 thus disconnecting the king bolt 125 from the clutches 141 and 142 but at this time the trailer and tractor are supposed to be immovable relative to each other or, in other words, standing still and while these operations are going on the crank 115 holds the lever 98 to hold the brakes set on the trailer and continued operation of the jack will lower the trailer until the connecters meet and interlock and until the king bolt 125 returns to its normal position in the clutches 141 and 142.

During the operation of connecting and disconnecting the trailer from the tractor there is more or less lost motion, the principal features of which are as follows:

When the jack is operated to raise the forward end of the trailer it must go high enough to more than allow the wheels 5 and 6 to clear the ground in swinging forward, then it must back up enough to allow the load of the trailer to rest upon the wheels 5 and 6 on the ground. During this operation the king bolt 125 is held by the clutches 141 and 142 and is drawn downwardly more than enough, then when the jack is reversed to leave the trailer standing the load of the front end of the trailer no longer rests upon the tractor and the springs of the tractor will expand and raise the platform 135 and this action raises the king bolt while the shaft 108 is set and the arms 129 and 130 cannot follow up. In order to support the king bolt at this time a friction device 215 (see Fig. 12) is provided the friction being strong enough to hold the king bolt from moving without being forced to move.

Continued operation of the jack will lower the front end of the trailer to bring the connecters of the trailer into operating relation with the connecters of the tractor and bring the king bolt 125 down until the flange 128 is below the clutches 141 and 142. Then the operating lever 162 is pulled backwardly; the hooks 193 and 194 will swing over the bars 197 and 198, the clutches 141 and 142 will move inwardly above the flange 128, the ring 119 will be released, the bell crank lever 115 will release the lever 98 thereby releasing the brakes on the trailer and the connection is made.

Various changes may be made without departing from the spirit of my invention.

I claim:

1. A semi-trailer comprising in combination a tractor having a platform with guides positioned thereon, a trailer having a king bolt loosely depending therefrom, the end of the king bolt being adapted to be guided on the platform between the guide ways to a central position, a turntable rotatably mounted on the trailer encircling the king bolt and interengaging locking means connecting the turntable and the platform forming a traction connection between the tractor and the trailer.

2. A semi-trailer as claimed in claim 1, having in addition jack levers pivotally mounted on the tractor having notches engaging cross bars depending from the turntable and means to operate said jack levers to elevate the cross bars and hence the front end of the trailer.

3. A semi-trailer comprising in combination a tractor having a platform at its rear end, flared guides tapering from the rear end of the platform to a central position, a trailer having a platform at its forward end, a tube secured thereto to occupy a substantially vertical position, a king bolt slidably mounted in said tube, the lower end of said king bolt being adapted to be guided by the platform on the tractor and the guides to the central position, a turntable rotatably mounted on the trailer adjacent the lower face of the platform, cross bars depending from said turntable and means operatively connected to the tractor to engage said cross bars forming the traction means between the tractor and the trailer.

4. A semi-trailer as claimed in claim 3 in which the means engaging the cross bars comprises jack levers pivotally mounted on the tractor, hooks pivotally mounted on the trailer adapted to engage the cross bars and hold them in locked position, and means to manually unlatch said hooks and a power device manually controlled to operate the said jacks levers to elevate the trailer after unlatching of the cross bars.

5. A semi-trailer comprising in combination a tractor having a platform at its rear end, a trailer having a king bolt loosely mounted in its forward end to have substantially a vertical sliding movement, the lower end of the king bolt being adapted to slide on the platform of the tractor, guides on said platform to guide the king bolt to a central position, jack bars pivotally mounted on the tractor adapted to operatively engage the front end of the trailer to elevate the same, means mounted on the trailer engaging the jack bars forming a traction connection, brakes mounted on the trailer, means operated by the sliding movement of the king bolt to set the brakes and means to restrain the king bolt from sliding upwardly on the elevation of the trailer.

6. The combination with a tractor of a semitrailer having secondary wheels for supporting its front end when disconnected and having brakes, connecter elements upon the tractor, connecter elements upon the trailer, a hand lever upon the tractor, a jack upon the tractor, a power mechanism upon the tractor for operating the jack, means for connecting the trailer to the tractor by vertical movement of the trailer, and means extending through the connecter elements for operating the brakes and secondary wheels of the trailer from the hand lever.

7. A semi-trailer comprising in combination a tractor, a trailer having a king bolt slidably mounted therein, a pair of traction wheels on said trailer, brakes for said wheels, means on the tractor to engage the forward end of the trailer to elevate same, means mounted on the tractor to restrain the king bolt from upward movement with the trailer, and means operated by the king bolt to set the brakes on the traction wheels of the trailer.

8. A semi-trailer as claimed in claim 7, in which the means to restrain the king bolt comprises a pair of plates slidably mounted on the tractor and manual means to operate said plates to hold the king bolt in its lowermost position and to release said king bolt for separation of the tractor and the trailer.

9. A semi-trailer as claimed in claim 7, having in addition a ring slidably mounted on the king bolt, an operative connection between said ring and the brakes on the trailer and manually operated means on the tractor to slide the said ring to operate the brakes on the trailer when in normal driving relation to the tractor.

10. A semi-trailer comprising in combination a tractor, a trailer having secondary wheels to support the forward end of the trailer when in standing position, struts pivotally connecting the said secondary wheels to the trailer, means normally retracting said wheels upwardly, means mounted on the tractor to elevate the forward end of the trailer, rods connected to the said struts and means to operate said rods in the elevation of the trailer to draw the struts forwardly.

11. A semi-trailer as claimed in claim 10, having in addition a pair of braces operatively connected at their lower ends to the secondary wheels, a slide mounted on the trailer and connected to the upper end of the struts, a latch hook, a rod connected thereto and means to operate said rod on the elevation of the tractor to engage the hooks and the said slide to hold the braces in rigid position when the secondary wheels are lowered.

12. A semi-trailer as claimed in claim 10, having in addition a pair of braces operatively connected to the secondary wheels and having their upper ends slidably mounted in relation to the trailer, hooks to latch said braces in their forward position to hold the secondary wheels lowered, and a manually operated device on the tractor to unlatch the hooks and thereby allow retraction of the secondary wheels on connecting the trailer to the tractor.

13. In an apparatus for connecting a semi-trailer to a tractor so that the forward end of the trailer rests upon the rear end of the tractor, a jack mounted upon the tractor and operated by the power plant of the tractor for raising and lowering the forward end of the trailer, interlocking connecter elements upon the tractor and trailer to be connected or disconnected by operating the jack to raise or lower the forward end of the trailer, and service elements upon the tractor and trailer for controlling the trailer and connected and disconnected by connecting and disconnecting the trailer.

14. A semi-trailer comprising in combination a tractor, a trailer having a platform at its forward end, a tube connected to said platform and a turntable swivelly mounted on the lower end of said tube and bearing against the under surface of the platform of the trailer, a king bolt slidably mounted in the tube, a pair of jack bars pivotally mounted on the trailer, said jack bars having notches at their rearward ends, a hydraulic cylinder operatively connected to the forward ends of the jack bars, means controlling the operation of said cylinder, an operative connection between the rear ends of the jack bars and the turntable adapted to elevate and lower the trailer forming a traction connection between the tractor and the trailer, and means mounted on the tractor to slide the king bolt in the said tube on the raising and lowering of the trailer.

15. In an apparatus for connecting a tractor and trailer so that the forward end of the trailer will rest upon the rear end of the tractor, struts pivotally connected to the forward end of the trailer frame, secondary wheels connected to the lower ends of the struts, a slide upon the trailer frame, braces connecting the slide to the secondary wheel mechanism, springs connecting the trailer frame to the secondary wheel mechanism, a hook for holding the slide, means connected to the struts and operated from the tractor for swinging the struts forwardly to bring the secondary wheels into position to support the forward end of the trailer and lock the braces, and means operated from the tractor for operating the hook to release the slide to allow the springs to withdraw the secondary wheels from their supporting positions.

16. In an apparatus for connecting a trailer to a tractor so that the forward end of the trailer will be carried by the rear end of the tractor, a king bolt mounted upon the trailer to slide vertically, a guideway upon the tractor to be engaged by the king bolt for centering the connecting mechanism, connecter elements upon the trailer, a turntable under the tractor, connecter elements upon the turntable adapted to engage the connecter elements upon the tractor, and a jack upon the tractor for raising and lowering the trailer to connect or disconnect the connecter elements.

17. A semi-trailer comprising in combination a tractor, a trailer having a king bolt slidably mounted therein, means on the tractor to engage the lower end of said king bolt and guide said king bolt into a central position, a jack device mounted on the tractor adapted to engage the forward end of the trailer to raise and lower same and forming part of the traction connection between the tractor and the trailer, a ring slidably mounted on the king bolt and means operated by said ring to manually control the brakes on the trailer from the tractor when the tractor and the trailer are in normal driving relation.

18. A semi-trailer as claimed in claim 17, having in addition an operating connection between the king bolt and the brakes of the trailer adapted to set said brakes when the trailer is elevated.

19. A semi-trailer comprising in combination a tractor, a trailer, a pair of secondary wheels carried by the trailer, said wheels being operatively connected to a pair of struts swivelly connected to the trailer and to a pair of braces slidingly connected to the trailer, a rock shaft mounted on the trailer, a rod connected between the rock shaft and the struts adapted to draw the struts forwardly and the secondary wheels into engagement with the ground, a jack bolt slidably mounted in the trailer in a substantially vertical direction, an operative connection between the jack bolt and the rock shaft, and means on the tractor to elevate the trailer and to slide the king bolt downwardly thereby operating the rock shaft and causing the lowering of the wheels.

20. A semi-trailer as claimed in claim 19, having in addition a latch means on the trailer to lock the braces in their forward position, and a manually operated device on the tractor having a sliding connection on the king bolt to the trailer adapted to unlatch the said latching means, and means to retract the secondary wheels.

21. A semi-trailer as claimed in claim 19, having in addition means operated by the rock shaft to set the brakes on the trailer in the elevation of the trailer.

22. A semi-trailer comprising in combination a tractor, a trailer, traction wheels on the trailer, brakes operated on said wheels, a slidably mounted king bolt on the trailer and an operative connection between the king bolt and the brakes adapted to set the brakes on the elevation of the trailer, and means mounted on the tractor to elevate the trailer, and means on the tractor to restrain the king bolt during the elevation of the trailer causing setting of the brakes.

23. A semi-trailer as claimed in claim 22, having in addition a manually operated device mounted on the tractor having a sliding connection with the king bolt from the tractor to the trailer, and means on the trailer having operative connection to said sliding means and to the brake mechanism, whereby the manually operated device on the tractor may be operated to cause the engagement of the brakes and hold said brakes set during the lowering of the trailer in regard to the tractor.

24. A semi-trailer comprising in combination a tractor, a trailer, a slidably mounted king bolt on the trailer, means mounted on the tractor to elevate the trailer, brakes on the trailer, a hand lever mounted on the tractor, a sliding element mounted on the king bolt, an operative connection between said element and the brakes on the trailer and the hand lever on the tractor whereby the hand lever may actuate the brakes on the trailer in normal driving operations.

25. A semi-trailer comprising in combination a tractor, a trailer, a slidably mounted king bolt on the trailer, means mounted on the tractor to elevate the trailer, means on the tractor to restrain the king bolt during the elevation of the tractor, secondary wheels adapted to hold the trailer elevated, said king bolt being mounted to have sliding movement on the upward reaction of the tractor when released of the weight of the trailer, and means to hold said king bolt in such elevated position.

In testimony whereof I have signed my name to this specification.

LAGAR RUAL CULVER.